United States Patent

[11] 3,571,509

[72] Inventors Donald J. Cross
Tonawanda;
Ira Eglowstein, Williamsville, N.Y.

[21] Appl. No. 765,191
[22] Filed Oct. 4, 1968
[45] Patented Mar. 16, 1971
[73] Assignee Sylvania Electric Products Inc.

[54] INHIBITING TRANSFER OF VIBRATORY ENERGY BETWEEN AN ACOUSTIC REPRODUCER AND A FLYING SPOT SCANNER TUBE
5 Claims, 1 Drawing Fig.

[52] U.S. Cl. .......... 178/7.9, 248/358, 312/7
[51] Int. Cl. .......... H04n 5/64
[50] Field of Search .......... 248/358, (Inquired); 312/7 (TV); 178/7.9; 179/100.12 (A)

[56] References Cited

UNITED STATES PATENTS

| | | | |
|---|---|---|---|
| 2,258,550 | 10/1941 | Frese | 248/358 |
| 2,325,807 | 8/1943 | Stephan | 179/100.12A |
| 2,477,923 | 8/1949 | Fitt | 178/7.9 |
| 2,562,257 | 7/1951 | Bill | 312/7TV |
| 2,922,483 | 1/1960 | Harris | 248/358 |
| 3,086,078 | 4/1963 | Sharma | 178/7.9 |

*Primary Examiner*—Robert L. Griffin
*Assistant Examiner*—Joseph A. Orsino, Jr.
*Attorneys*—Norman J. O'Malley, Cyril A. Krenzer and Thomas H. Buffton

ABSTRACT: Vibrations from a speaker mounted on a wall of a cabinet of a television receiver via the walls of the cabinet are minimized by providing a slot in the wall which mounts the equipment to isolate the vibrations from the equipment.

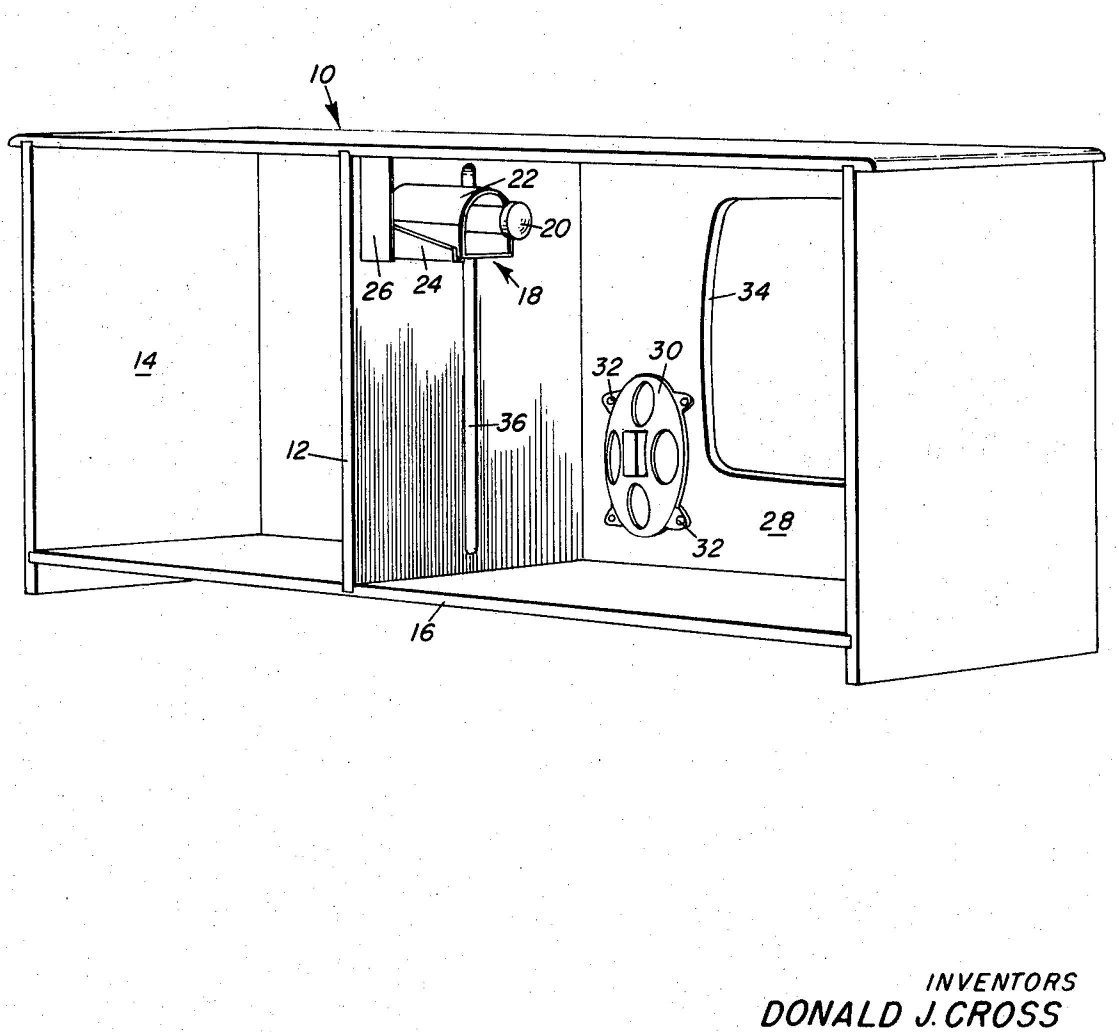
INVENTORS
DONALD J. CROSS
IRA EGLOWSTEIN
BY Cyril A. Krenzer
ATTORNEY

INHIBITING TRANSFER OF VIBRATORY ENERGY BETWEEN AN ACOUSTIC REPRODUCER AND A FLYING SPOT SCANNER TUBE

BACKGROUND OF THE INVENTION

This invention relates to means for preventing transmission of vibrations through a solid media from a vibration producing device to a second device which would be deleteriously affected by the presence of these vibrations, both the devices being attached to the solid media.

Specifically this invention relates to means for preventing transfer of vibrations through the walls of a cabinet, the vibrations being those which are produced by an acoustic reproducer and without this invention transmitted to a flying spot scanner tube where both are mounted on a wall or walls of the cabinet.

OBJECTS AND SUMMARY OF THE INVENTION

It is an object of this invention to provide a simple inexpensive means to prevent transfer of vibrations through a media from a vibration producing means to a second means which is adversely affected by the reception of these vibrations.

And more specifically, it is an object of this invention to inhibit the transfer of energy through the cabinet walls from an acoustic reproducer mounted on a wall of the cabinet to a flying spot scanner mounted on a wall of the cabinet.

According to one aspect of the invention, an air gap in the form of a vertical slot in the wall of a cabinet which gap is between a speaker assembly and a flying spot scanner tube effectively isolates the flying spot scanner tube from acoustical vibrations emanating from the speaker assembly.

BRIEF DESCRIPTION OF THE DRAWING

The single FIGURE is a perspective view of a cabinet intended to receive television equipment as well as to other equipment and in which is mounted an acoustic reproducer and a flying spot scanner tube.

DESCRIPTION OF THE PREFERRED EMBODIMENT

For a better understanding of the present invention together with other and further objects, advantages and capabilites thereof, reference is made to the following disclosure and appended claims in connection with the above-described drawing.

In the drawing, the reference character 10 indicates a television cabinet divided by a vertical partition 12 into two compartments 14 and 16. The compartment 14 is provided to house instrumentalities to convert scanned films into electrical signals which are then transmitted to a television receiver in compartment 16.

In order to provide for the scanning of the film in compartment 14, there is mounted opposite an aperture at the upper rear corner of the partition wall a flying spot scanner arrangement 18 including a flying spot scanning tube 20 only the neck portion of which is shown, the remainder being shielded, as by the aid of a cover 22. The tube is supported in a cradle 24 which is supported in a mounting bracket 26 fastened to the partition wall. The specific mounting of the tube, insofar as invention is concerned is of no importance except for the fact that the mounting on the wall 12 is of a character to transmit vibrations from the wall to the tube. This causes jitter in the tube resulting in imperfect scanning movements of the cathode ray in the tube. For an amplification of the description of the mounting means for the tube, reference may be had to the application of Donald J. Cross and George C. Waybright, filed of even date herewith and bearing Ser. No. 765,237, now U.S. Pat. No. 3,527,884, for "Demountable System for Flying Spot Scanner". By the simple ingenious means provided by this invention, this jitter is eliminated, as will be described.

Mounted on the rear of the front wall 28 of the compartment 16 is an acoustic reproducer or loudspeaker 30, as by screws 32 holding the speaker directly against the wall. This speaker is in the lower corner of the front wall adjacent the partition 12 and adjacent the window 34 in the front wall for accommodating the face of a picture tube. The speaker is mounted in that location by reason of exigencies arising out of emplacement of other equipment in the cabinet and for closeness of association with the picture tube as well as for tone quality.

The partition wall 12 is glued or otherwise firmly joined with front wall 28 and is in vibration conduction relationship therewith, the vibrations traveling from the acoustic reproducer via the front wall and partition wall toward the tube arrangement 18. To intercept this vibration transmitting path, there is provided in the partition wall 12 a vertical slot cut entirely through the thickness of the partition, which may be of wood, and extending from very close to he top of the partition to very nearly the bottom of the partition, leaving enough partition material at the top and bottom to ensure the maintaining of the partition in one piece during the handling thereof. Preferably the vertical slot is close to the mounting means of the tube through when it is substantially halfway across the width of the partition, very satisfactory results have been obtained. The slot width is not critical and the partition wall preferably extends substantially the entire depth of the cabinet so as to provide a sound chamber (when the back wall is in place) for the speaker 30.

The provision of the slot is a simple means for preventing vibration transfer from the loudspeaker to the scanner tube and avoids the necessity of using padding or springs to mount parts on the walls of the cabinet.

While there has been shown and described what is at present considered the preferred embodiment of the invention, it will be obvious to those skilled in the art that various changes and modifications may be made therein without departing from the scope of the invention as defined by the appended claims.

We claim:

1. A cabinet having walls directly joined together, an acoustic reproducer, which in its operation produces mechanical vibration in its support, mounted on a first wall, a flying spot scanning tube, which is deleteriously affected by vibrations, mounted on a second wall which is in vibration transmission contact with said first wall, and means to minimize the transfer of vibratory energy from said first wall via the second wall to said flying spot scanning tube comprising a slot in said second wall impeding transfer of vibration, said slot being intermediate said flying spot scanning tube and the first wall.

2. The structure of claim 1 in which the slot extends substantially throughout the height of the second wall.

3. The structure of claim 1 in which the slot extends vertically and is at least halfway across the width of the second wall.

4. The structure of claim 1 wherein the acoustic reproducer is mounted on the front wall of a television cabinet, said cabinet having an aperture in the front wall to provide a window for display of the face of a television tube, and wherein the second wall is at right angles to the front wall.

5. The structure of claim 4 wherein the acoustic reproducer is a speaker mounted in a corner of the front wall close to the second wall and the flying spot scanning tube is mounted on the second wall in the upper corner of the wall most remote from the front wall.